United States Patent [19]

Herrick

[11] Patent Number: 4,481,077
[45] Date of Patent: Nov. 6, 1984

[54] PROCESS FOR PREPARING MICROFIBRILLATED CELLULOSE

[75] Inventor: Franklin W. Herrick, Shelton, Wash.

[73] Assignee: International Telephone and Telegraph Corporation, New York, N.Y.

[21] Appl. No.: 479,556

[22] Filed: Mar. 28, 1983

[51] Int. Cl.$^3$ .............................................. D21H 3/00
[52] U.S. Cl. ...................................... 162/158; 162/9; 162/100; 162/175; 162/177; 162/181.2; 162/181.3; 162/182; 162/187
[58] Field of Search .................... 162/141, 176, 181.2, 162/181.3, 187, 158, 175, 100, 201, 9, 24, 182, 183, 102; 241/5, 28, 40

[56] References Cited

U.S. PATENT DOCUMENTS

| | | | |
|---|---|---|---|
| 1,406,410 | 2/1922 | Peabody | 162/176 |
| 1,949,534 | 3/1934 | Doyle | 162/187 |
| 1,992,996 | 3/1935 | Dodge | 162/187 |
| 2,054,301 | 9/1936 | Richter | 162/187 |
| 2,132,724 | 10/1938 | Dalton | 162/176 |
| 2,566,130 | 8/1951 | Karlson et al. | 162/187 |
| 4,144,122 | 3/1979 | Emanuelsson et al. | 162/158 |
| 4,341,807 | 7/1982 | Turbak et al. | 426/589 |
| 4,374,702 | 2/1983 | Turbak et al. | 162/187 |

FOREIGN PATENT DOCUMENTS 949464 2/1964 United Kingdom ................ 162/187

OTHER PUBLICATIONS

Clark, *THe Effects of Beating on Cellulose Fibers,* Paper Trade Journal, (Dec. 28, 1933), pp. 311–317.
Svensk Papperstidning, Kolmodin et al., No. 12, pp. 73–78, 1981.

*Primary Examiner*—Peter Chin
*Attorney, Agent, or Firm*—James B. Raden; Harold J. Holt

[57] ABSTRACT

A process of preparing microfibrillated cellulose comprising adding to never-dried cellulosic pulp an additive compound capable of substantially inhibiting hydrogen bonding of the fibrils in the cellulose and then drying the pulp and additive. Microfibrillation of a suspension of the cellulosic pulp is carried out at considerably increased efficiency if the additive compound is present prior to drying the pulp. The resulting MFC product can be dried and redispersed without substantial loss of viscosity.

8 Claims, No Drawings

PROCESS FOR PREPARING MICROFIBRILLATED CELLULOSE

This invention relates to a process for preparing microfibrillated celulose and particularly to a process of preparing microfibrillated cellulose from cellulose which may be dried.

Microfibrillated cellulose is a natural cellulose in which the cellulose fibers have been opened up and unravelled to form fibrils and microfibrils by repeated passage through a homogenizer. Microfibrillated cellulose is characterized by very high water retention values, a high degree of chemical accessibility and the ability to form stable gels in water or other polar solvents. Its preparation and properties are more fully disclosed in U.S. Pat. No. 4,374,702 and a variety of uses are shown in U.S. Pat. Nos. 4,341,807 and 4,378,381. The disclosure of these U.S. patents is hereby incorporated by reference.

The ability to be rehydrated, after drying or dehydration, is a desirable goal for many hydrated materials, both cellulosic and non-cellulosic. This is a particularly desirable goal for many foods and medicines which, once dehydrated, are difficult or impossible to rehydrate. In the case of conventional cellulosic pulps, drying is known to reduce the chemical reactivity and water absorbency of the pulps. It is also known in wood pulp technology that certain additives can be used to reduce the inter-fiber bonding that occurs on drying. Debonding agents have been added to pulps before drying to reduce the energy required to defiber pulp sheets; i.e., separate the dry fibers for use, for example, in fluffed pulps. Such debonding agents are generally cationic surfactants such as fatty acid quaternary amines which function at low percentage additions. See, for example, Svensk Paperstidning, Kolmodin et al, No. 12, pgs. 73-78, 1981 and U.S. Pat. No. 4,144,122.

My copending application Ser. No. 479,555, filed of even date herewith, discloses a process of enabling microfibrillated cellulose to be dried and redispersed by the addition of an additive compound to the microfibrillated cellulose dispersion, the additive compound functioning to substantially inhibit hydrogen bonding between the cellulose fibrils. The disclosure of this copending application is hereby incorporated by reference.

The present invention is based upon the discovery that by mixing the additive with the cellulosic pulp prior to microfibrillation, considerable cost reduction occurs in the homogenization or microfibrillation process if dry pulp is used as the starting material rather than pulp which has never been dried, so-called never-dried pulp. The process of the invention comprises adding to never-dried pulp an additive compound capable of substantially inhibiting hydrogen bonding of the fibrils in the cellulose, drying the cellulosic pulp and additive compound, adding a liquid to said dried cellulosic pulp and additive compound to form a liquid suspension thereof and passing said liquid suspension through a homogenizer to form a suspension of microfibrillated cellulose.

The additive should be a compound capable of substantially inhibiting hydrogen bonding between the cellulosic fibrils in the cellulose. It should also be one which does not react with the cellulose, nor have substantial volatility, at the drying temperature. A wide number of organic and inorganic additive compounds, both liquid and solid, have been found to possess the characteristics required to reduce the drying stresses and achieve the foregoing improved efficiencies in the microfibrillation process. The additive compounds must be used in substantial quantities, generally at least one half the dried weight of the cellulosic pulp and preferably at least equal to the pulp weight. Among the most useful additives are polyhydroxy compounds including particularly carbohydrate or carbohydrate related compounds, other than cellulose itself, such as glycols, sugars, carbohydrate gums, starches, oligo- and polysaccharides, seaweed (marine plant) extracts and derivatives of the carbohydrate and glycol related compounds. By derivatives herein is meant substituted or other first stage reaction products of carbohydrates or glycols which retain their polyhydroxy functionality and their carbohydrate or glycol characteristics. Useful glycols include ethylene, propylene, dipropylene and butylene glycol, glycerin, low molecular weight glycol polymers such as the polyglycols and such glycol derivatives as triethanol amine. Useful sugars include the common 5 and 6 carbon sugars such as glucose (dextrose), mannose and galactose and dissaccharides such as sucrose and lactose; sugar alcohols such as mannitol and sorbitol; such carbohydrate derivatives as the bisulfite adducts of the common sugars such as sodium mannose bisulfite and sodium glucose bisulfite; sugar acids such as aldonic acids, saccharic and saccharinic acids and uronic acids; and the very broad glycoside group of acetal derivatives of sugars such as methyl glucoside. Certain foods containing large proportions of sugars, pectins or plant gums are also useful such as fruit and vegetable pulps and non-fat dry milk. Other useful carbohydrate derivatives are the carboxymethyl and hydroxyethyl starches, carboxymethyl and hydroxyethyl cellulose and methyl and ethyl cellulose. A very effective and economical polyhydroxy additive is sucrose, a disaccharide that is easily dried as a nonhydrated complex with cellulose.

In addition to the polyhydroxy compounds, the alkali metal (e.g., sodium, potassium) salts of borates, polyborates, phosphates and polyphosphates are also useful, although not as effective as the polyhydroxy compounds. In addition, certain aprotic solvents such as dimethylsulfoxide or a dialkylacylamide such as dimethylacetamide and dimethylformamide are also effective additives. These aprotic solvents, are components of solvent systems for cellulose (see for example U.S. Pat. Nos. 4,076,933 and 4,302,252). The inorganic salts and aprotic solvents are believed to form complexes with cellulose or hydroxyl groups and thus prevent hydrogen bonding.

In general, low molecular weight compounds are the best additives. At approximately equal levels of cellulosic pulp and additive, low molecular weight compounds do not affect viscosity characteristics of the microfibrillated cellulose dispersion. Higher molecular weight additives, such as carboxymethyl cellulose of hydroxyethyl cellulose, increase viscosity in proportion to their concentration and molecular weight; however, such mixtures with microfibrillated cellulose redisperse very nicely, indicating that molecular size does not prevent hydrogen bonding with cellulose on drying which in turn prevents cellulose from bonding with itself.

In the aforementioned U.S. Pat. Nos. 4,341,807 and 4,378,381 covering uses of microfibrillated cellulose, reference is made to the preparation of microfibrillated cellulose with mixtures of glycerin and water and to the addition of certain hydrophilic polymers to assist the process of microfibrillation of the cellulose. There is also disclosed the addition of such food additives as sucrose to certain of the microfibrillated cellulose formulations. However, there is no disclosure of drying cellulose with these additives nor is there recognition in these patents that these additives are capable of reducing the cost of the microfibrillation process itself when using dried cellulosic pulp.

The amount of the additive required in the process of the invention will vary considerably depending on which additive is used, the degree of microfibrillation of the cellulose, the extent to which the cellulosic pulp is subsequently dried and the severity of the drying process. Generally, however, the amount will vary from as little as one half to as high as twice the weight of the cellulose. If the additive is itself intended as the major component of the final microfibrillated cellulose product, it may be used in amounts exceeding twice the weight of the cellulose although such excess will increase the processing cost and is unnecessary.

Cellulosic pulps that have not previously been dried, never-dried pulps, are more responsive to homogenization that dry pulp stocks. Drying the pulp with the additive present prevents a type of drying stress that occurs and is equivalent to a number of passes of homogenization. Thus, for example, instead of a 10 pass homogenization process on standard dry pulp without additive to produce a high-viscosity microfibrillated cellulose, a 5 pass process on dry additive-treated pulp will obtain similar viscosity characteristics. In effect, the never-dried, easily homogenized characteristics of a woodpulp can be retained in a dry pulp raw material if the never-dried pulp is treated with one of the aforementioned additives prior to drying.

In the process of the invention, a wet never-dried pulp is treated with about 50 to 200% of its dry weight of additive and blended. The treated pulp may then be dried under conventional pulp mill drying conditions to produce a cellulosic raw material in convenient dry form for long-term storage or shipping. Drying may for example be carried out at from 50° to 105° C. under ambient or forced-draft conditions. The dried pulp may then be mixed with a suitable liquid to prepare a suspension suitable for passage through a homogenizer for microfibrillation. Microfibrillated cellulose is normally prepared as a liquid dispersion or suspension containing less than about 10% cellulose by weight and usually from about 1–6%, the specific concentration depending on whether cut or uncut pulp stocks or whether laboratory or commercial size homogenizers are used in microfibrillated cellulose preparation. Except as otherwise herein set forth, the preparation of microfibrillated cellulose is as set forth in the aforesaid U.S. Pat. No. 4,374,702. As there set forth, the process involves passing a liquid suspension of fibrous cellulose through a small diameter orifice in which the suspension is subjected to a pressure drop of at least 3000 psi and a high velocity shearing action followed by a high velocity decelerating impact and repeating the passage of the suspension through the orifice until the cellulose suspension becomes substantially stable. The resulting microfibrillated cellulose product is generally characterized as having a water retention value of over 280%, a settling volume after 60 minutes in a 0.5% by weight suspension in water of greater than 60% and a rate of degradation increase by hydrolysis at 60° C. in one molar hydrochloric acid at least twice as great as cellulose beaten to a Canadian Standard Freeness value of 50.

The microfibrillated cellulose product produced as set forth above may then be dried as set forth in my aforesaid copending application Ser. No. 479,555. The additive compound, added prior to microfibrillation, permits the microfibrillated cellulose to recover at least 50% of its initial viscosity in water after it is dried, depending on the severity of drying. With the preferred additive compounds, this recovery is over 75% and in many cases the recovery approaches nearly 100% of the original viscosity.

It should be understood that in an ambient environment, "dry" cellulosic materials contain some moisture content. As used herein, dry cellulose is intended to identify cellulose containing less than about 15% moisture, and usually from 4–8%. At these dryness levels, dry cellulosic pulp encounters the rehydration and homogenization problems set forth herein if the additive of the invention is not used.

The following examples illustrate the practice of the invention. Unless otherwise indicated, all parts and percentages are by weight.

EXAMPLE 1

This example illustrates the preparation of a 4 liter bath of 2% MFC from a dried bleached southern pine sulfite without the addition of the additive compound. The pulp was dry cut to reduce the pulp fiber length to 0.7 mm and contained 13% moisture. A laboratory Gaulin homogenizer was used at 55 mPa (megaPascals, 8000 psi) pressure. An initial 1% slurry was prepared by mixing 46 g of the pulp (40 g dry basis) with 4 l of deionized water. This slurry was placed in the homogenizer reservoir and stirred while being pumped through the machine in a recycle fashion for 12 minutes or the equivalent of two passes. This amount of homogenization, was enough to provide a uniform fiber dispersion, including an additional 46 g of pulp to raise the solids content to 2%. During this preliminary stage, temperature rose from 20° to 52° C. At this point, successive passes through the homogenizer were begun and material from each pass was collected until the reservoir was nearly empty (100 ml). The pump was then turned off and the collected material was stirred and returned to the reservoir following temperature measurement. After a brief pumping time in the recycle mode, each pass was timed from the start of product collection until pump shut-off.

After the 10th pass, about 200 ml of water was used to displace material in the apparatus. Recovered product weighed 3708 g and contained 2.17% solids. When diluted to 2% solids this product has the following viscosity properties at 22° C., measured with a Fann Model 39 recording voscometer at a shear rate of 1000 sec$^{-1}$.

| Passes | Viscosity, mPa · s |
|---|---|
| 5 | 70 |
| 10 | 144 |

The solids content of MFC products was determined by drying 10 to 20 g samples for 18 hours at 80° C. in a forced draft oven, followed by two hours at 105° C.

A simple test to measure the effectiveness of the additive in dried MFC was used. The test involved mixing 400 g of 2% MFC (8 g MFC solids) weight/8 g dry basis additive. The viscosity of this mixture was recorded. Dry films were then prepared because the drying rate and stress of films could be controlled with relatively small samples. The films were then cut into small squares and redispersed at 2% MFC solids in water.

EXAMPLE 2

A sample of bleached sulfite pulp which was at a 30% consistency and had not previously been dried was treated with a dry additive at either 67/33 or 50/50 levels of MFC/additive, or in the case of the control, with no additive. The pulp and additive were thoroughly mixed, dried at 60° C. and dry cut to 0.7 mm fiber length. Slurries containing 2% of the cellulosic pulp were then microfibrillated as in Example 1 by passing through the homogenizer from 2 to 10 times. Films of the MFC were then prepared and dried at 60° C. as set forth above. The following table shows the viscosity of the original MFC dispersions after various numbers of passes through the homogenizer. It also shows the viscosity levels after drying and dispersing the 10 pass MFC samples.

| Sample | MFC/Additive | | Viscosity Original Dispersion (mPa/1000 sec$^{-1}$) | Viscosity Redispersion (mPa/1000 sec$^{-1}$) |
|---|---|---|---|---|
| 1 | 100 MFC/ no additive | 5 pass | 70 | 20-30 |
|   |   | 10 pass | 144 |   |
| 2 | sucrose |   |   |   |
|   | 66/33 | 5 pass | 164 | 131 |
|   |   | 10 pass | 219 |   |
|   | 50/50 | 2 pass | 82 | 244 |
|   |   | 5 pass | 201 |   |
|   |   | 10 pass | 258 |   |
| 3 | glycerin* |   |   |   |
|   | 77/23 | 5 pass | 152 | 127* |
|   |   | 10 pass | 217 |   |
|   | 81/19 | 5 pass | 135 | 78* |
|   |   | 10 pass | 254 |   |

*The loss of glycerin on drying reduced the MFC/ glycerin weight ratio from 67/33 to 77/23 and from 75/25 to 81/19.

The above table indicates that the additive may be used to reduce homogenization energy by 50% or more. That is, both the 67/33 and 50/50 MFC/sucrose samples prepared by 5 passes through the homogenizer had higher original viscosity than the 100% MFC prepared by 10 passes through the homogenizer. Moreover, the table results also show that by mixing the additive with the cellulose prior to homogenization, the stresses introduced by drying before homogenization are essentially eliminated while the dispersibility of the cellulose, after homogenization, is substantially maintained.

EXAMPLE 3

A 1114 g quantity of wet never-dried Western hemlock sulfite pulp containing 200 g of dry cellulose was treated with 200 g of sucrose. The mixture was thoroughly blended and dried at 60° C. to a dry weight of 403 g. The mixture was then dry cut to a fiber length of 0.7 mm. The moisture content of this product was 6%.

An 85.1 g quantity (80 g dry weight) of the above treated pulp was homogenized in 2000 g of water using a Gaulin laboratory homogenizer as in Example 1. The slurry was passed 10 times through the homogenizer at a pressure of 55 mPa (8000 psi) while temperature gradually increased from 67° to 78° C. Samples obtained at 5 and 10 passes were adjusted to 4% solids content (50/50 weight percent MFC/sucrose). Viscosity was measured at room temperature.

| Product | 2% MFC Basis Viscosity, mPa · s, 1000 sec$^{-1}$, 22-24° C. |
|---|---|
| 5 pass | 187 |
| 10 pass | 230 |

A similar test was conducted using the same pulp with no additive. Corresponding viscosity tests of 2% MFC slurries were: 5 pass, 80 mPa.s and 10 pass, 165 mPa.s at 1000 sec$^{-1}$, 22° C. The MFC prepared with the sucrose additive yielded a dry product that was redispersible to the same viscosity as the undried slurry.

In the claims:

1. A process of preparing microfibrillated cellulose comprising adding to never-dried cellulosic pulp an additive compound capable of substantially inhibiting hydrogen bonding of the fibrils in the cellulose, said additive compound being non-reactive with said cellulose and not having substantial volatility during drying, drying said cellulosic pulp and additive compound to a moisture content no greater than 15%, adding a liquid to said dried cellulosic pulp and additive compound to form a liquid suspension thereof and passing said liquid suspension through a high pressure homogenizer having a small diameter orifice in which said suspension is subjected to a pressure drop of at least 3000 psi followed by a high velocity decelerating impact against a solid surface to form a suspension of microfibrillated cellulose.

2. The process of claim 1 in which the liquid suspension is repeatedly passed through the homogenizer until the suspension becomes a substantially stable suspension, said process requiring fewer passes through the homogenizer than would be necessary without said additive compound.

3. The process of claim 1 in which the additive compound is present at levels of at least one half the weight of the cellulose.

4. The process of claim 1 in which said additive compound is selected from the group consisting of a polyhydroxy compound, an alkali metal salt and an aprotic solvent.

5. The process of claim 4 in which said additive compound is selected from the group consisting of a carbohydrate, a glycol and derivatives thereof.

6. The process of claim 5 in which said additive compound is a carbohydrate.

7. The process of claim 6 in which the carbohydrate is sucrose in an amount of about one half to two times the weight of the cellulose.

8. The process of claim 1 in which the suspension of MFC is dried.

* * * * *